(12) United States Patent
Nayef et al.

(10) Patent No.: US 7,723,858 B2
(45) Date of Patent: May 25, 2010

(54) POWER PLANT HAVING A HEAT STORAGE MEDIUM AND A METHOD OF OPERATION THEREOF

(75) Inventors: Duraid S. Nayef, Orangeville (CA); Na'al S. Nayef, Orangeville (CA)

(73) Assignee: New World Generation Inc., Owen Sound, Ontario (CA)

( * ) Notice: Subject to any disclaimer, the term of this patent is extended or adjusted under 35 U.S.C. 154(b) by 145 days.

(21) Appl. No.: 11/813,483

(22) PCT Filed: Jan. 10, 2006

(86) PCT No.: PCT/CA2006/000027

§ 371 (c)(1), (2), (4) Date: Jul. 6, 2007

(87) PCT Pub. No.: WO2006/072185

PCT Pub. Date: Jul. 13, 2006

(65) Prior Publication Data

US 2008/0134681 A1 Jun. 12, 2008

(51) Int. Cl.
*F01K 17/00* (2006.01)
*F01K 3/00* (2006.01)

(52) U.S. Cl. ............... 290/2; 60/650; 60/659

(58) Field of Classification Search .......... 290/2; 60/650, 659
See application file for complete search history.

(56) References Cited

U.S. PATENT DOCUMENTS

| 3,818,697 | A | | 6/1974 | Waagner-Biro | |
|---|---|---|---|---|---|
| 3,886,749 | A | * | 6/1975 | Pacault | 60/652 |
| 4,003,786 | A | * | 1/1977 | Cahn | 376/322 |
| 4,285,203 | A | * | 8/1981 | Vakil | 60/652 |
| 4,455,835 | A | * | 6/1984 | Durrant | 60/659 |
| 5,384,489 | A | * | 1/1995 | Bellac | 290/44 |
| 6,955,050 | B2 | * | 10/2005 | Perkins et al. | 60/645 |
| 7,086,231 | B2 | * | 8/2006 | Pinkerton | 60/650 |
| 2005/0126172 | A1 | * | 6/2005 | Hudson et al. | 60/659 |
| 2007/0220889 | A1 | * | 9/2007 | Nayef et al. | 60/652 |
| 2008/0022683 | A1 | * | 1/2008 | Ohler et al. | 60/641.8 |
| 2008/0219651 | A1 | * | 9/2008 | Nayef | 392/485 |

FOREIGN PATENT DOCUMENTS

| JP | 60178908 | A | * | 9/1985 |
|---|---|---|---|---|
| JP | 02267462 | A | * | 11/1990 |
| JP | 02267463 | A | * | 11/1990 |
| JP | 03264711 | A | * | 11/1991 |
| JP | 04068295 | A | * | 3/1992 |
| JP | 09222003 | A | * | 8/1997 |
| JP | 2000320899 | A | * | 11/2000 |
| JP | 2004138043 | | | 5/2004 |
| WO | WO 9005271 | A | * | 5/1990 |

* cited by examiner

*Primary Examiner*—Joseph Waks
(74) *Attorney, Agent, or Firm*—Miller Thomson LLP.; Daryl W Schnurr

(57) ABSTRACT

A power plant for generating electricity has a high temperature heat reservoir and a low temperature heat reservoir. The plant is operated to store heat during off peak power periods and to use the stored heat during peak power periods to produce additional electricity.

12 Claims, 3 Drawing Sheets

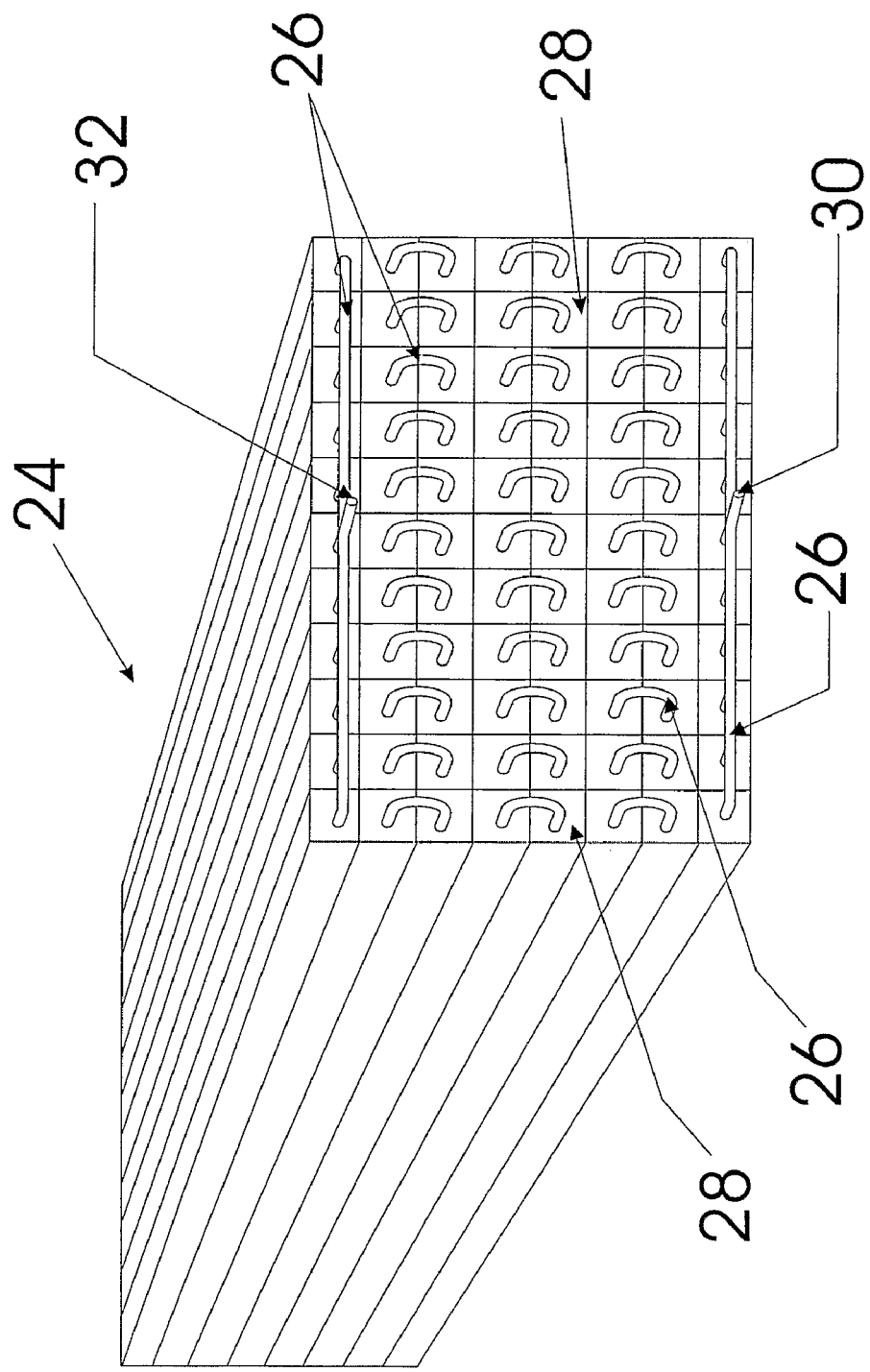

POWER PLANT HAVING A HEAT STORAGE MEDIUM AND A METHOD OF OPERATION THEREOF

BACKGROUND OF THE INVENTION

This invention relates to a power plant for generating electricity and a method of operation thereof where all or part of the electricity produced during off peak power periods is converted to heat energy and stored in a high temperature heat reservoir for use in creating electricity during peak power periods. More particularly, the high temperature heat reservoir and a heat storage area of the reservoir as made from solid material.

DESCRIPTION OF THE PRIOR ART

Power plants for producing electricity from various energy sources including wind turbines, solar energy, nuclear energy hot exhaust gases from industrial plants as well as other sources of electricity are known. The Bellac U.S. Pat. No. 5,384,489 describes a wind powered electricity generating system including wind energy storage whereby wind energy is used to heat a heat transfer fluid. After being heated, the heated fluid is added to an insulated storage tank. The heated thermal fluid is used to generate electricity during periods of low wind speed and or high electricity demand. The heated thermal fluid is introduced to a heat exchanger and is used to create steam in a vapourizer chamber. The steam is then directed to a steam powered electricity generator. The thermal dynamic conversion efficiency of the storage and recovery system described in the Bellac Patent is said to be low. Various fluids are suggested as the heat transfer fluid, including water. The storage tank is not pressurized and the heat transfer fluid is in liquid form as the heat transfer fluid is stated to be at atmospheric pressure.

Previous systems are inefficient and cannot be used to store energy at high temperatures. For example, the system described in the Bellac patent cannot be used to store energy at temperatures exceeding the boiling point of the heat transfer fluid that is located in the insulated storage tank.

SUMMARY OF THE INVENTION

It is an object of the present invention to provide a power plant for producing electricity where the plant has a high temperature heat reservoir and a low temperature heat reservoir, the heat reservoirs being used to store heat and to supply heat to be used to produce electricity. It is a further object of the present invention to provide a solid heat storage medium that can be heated to a high temperature exceeding 100° C. and, preferably, in the range of 200° C. to 900° C. It is still a further object of the present invention to provide a power plant that is designed to be operated on a continuous basis at full capacity. A further object of the present invention is to provide power plants with the flexibility of operation to meet the daily changing demand without reducing the power plant operating efficiency.

A power plant for generating electricity comprises an energy source, turbines to convert energy from the energy source to electricity, a high temperature heat reservoir and a low temperature heat reservoir. The high temperature heat reservoir is solid and is connected to receive at least some of the electricity generated by the power plant. The low temperature heat reservoir is connected to receive steam from the turbines. The reservoirs are connected to return heat energy to the turbines, with a controller for the power plant to operate the power plant to store energy in the reservoirs during off peak power periods and to transfer heat from the low temperature heat reservoir to the high temperature heat reservoir and from the high temperature heat reservoir to turbines during high peak, power periods. The turbines are connected to produce electricity from the heat energy.

A method of operating a power plant is provided for producing electricity uses a power plant having an energy source and means to convert energy from the energy source to electricity, a high temperature heat reservoir and a low temperature heat reservoir. The method comprises operating the power plant substantially at maximum output capacity on a continuous basis during high peak power periods and off peak power periods, using at least part of the electricity generated by the power plant during off peak power periods to transfer heat to the high temperature heat reservoir, transferring some steam from the turbines to the low temperature heat reservoir, controlling the plant to charge and discharge the heat reservoirs as required and to transfer heat from the low temperature heat reservoir to the high temperature heat reservoir and from the high temperature heat reservoir to the turbines during peak power periods.

BRIEF DESCRIPTION OF THE DRAWINGS

FIG. 3 is a schematic perspective view of a low temperature heat reservoir.

DESCRIPTION OF A PREFERRED EMBODIMENT

Figure 1:
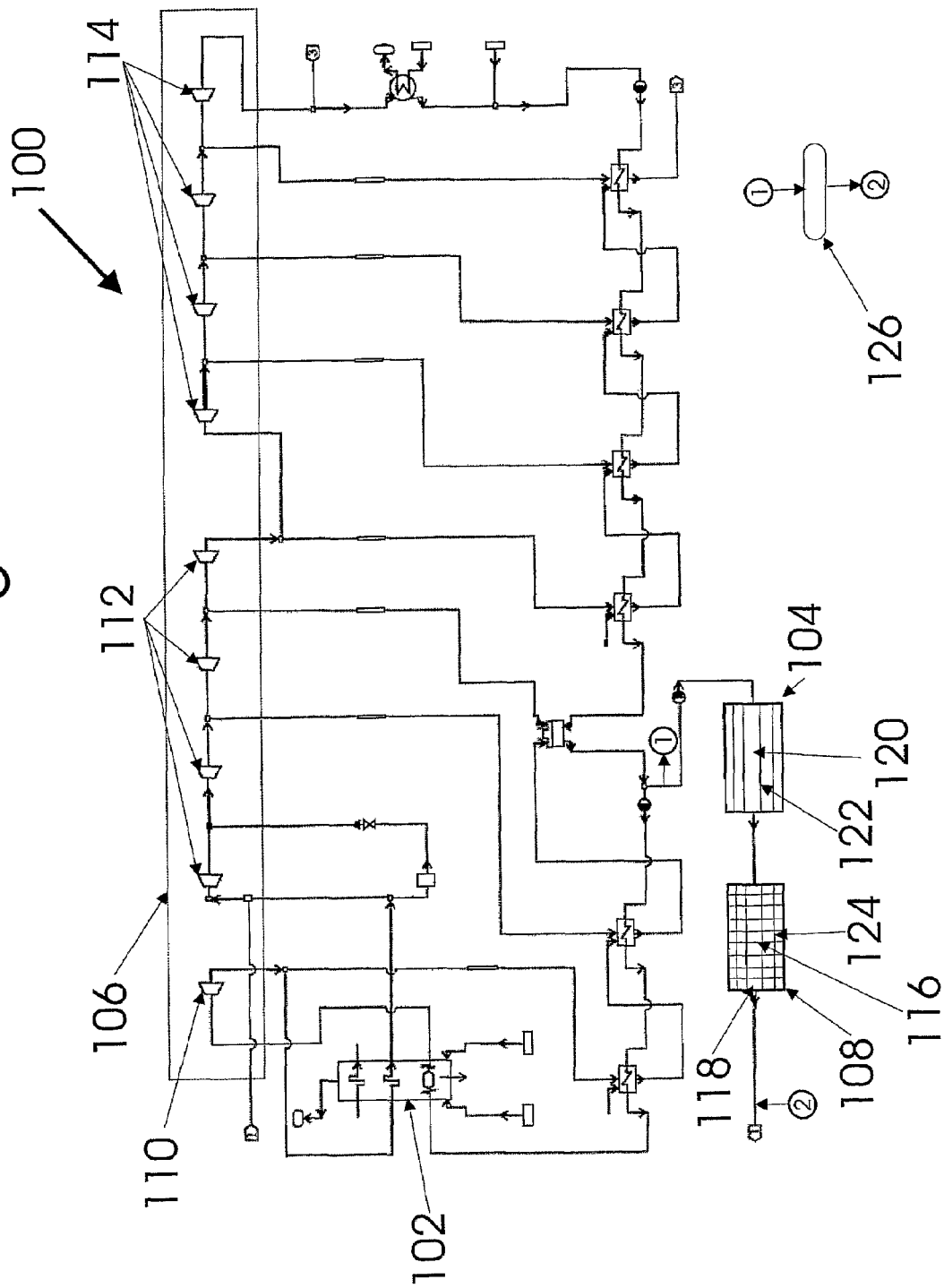
FIG. 1 is a schematic diagram of a power plant with thermal storage charging and discharging cycles.

In FIG. 1, a power plant 100 of the present invention has a boiler 102 that can be fuelled by various energy sources including, natural gas, coal, nuclear, oil, solar, wind turbines and water power. The boiler 102 can be powered by any one or more of these energy sources. The plant has a low temperature heat reservoir 104 which can be operated in a discharging mode or a charging mode in FIG. 1. The boiler 102 produces steam which powers one or more steam turbines 106 to produce electricity. Preferably, during charging as shown in FIG. 1, part of the electricity produced during off peak hours is directed to the high temperature heat reservoir 108. Steam from the boiler passes through the high pressure turbines 110, intermediate pressure turbines 112 and through the low pressure turbines 114. Steam is directed from an exit of a reheat cycle located between the high pressure and the intermediate pressure turbines 112 to the low temperature heat reservoir 104. The steam increases the temperature of the low temperature reservoir 104 and the heat collected from the steam is stored in that reservoir 104. Steam leaving the low temperature reservoir at lower temperatures is redirected and induced with the steam going to the inlet of the intermediate pressure turbines 112 to produce electricity.

The high temperature heat reservoir 108 has a plurality of electric heaters 116 distributed in a heat storage area thereof. The electricity from the turbines powers the electric heaters 116 and the heat generated is stored in a heat storage area 118 of the high temperature heat reservoir 108. The high temperature heat reservoir 108 is charged by the electric heaters 116. The low temperature heat reservoir 104 is charged by steam from the reheat cycle located between the high pressure turbine and the intermediate pressure turbine 112 passing through appropriate channels 122 in the low temperature heat reservoir 104. The steam is at a higher temperature than a heat storage area 120 of the low temperature heat reservoir 104. The low temperature reservoir 104 is connected to the high temperature reservoir 108. During high peak power periods, the low temperature reservoir 104 and the high temperature reservoir 108 discharge. Feed water or steam passes through the channels 122 in the low temperature heat reservoir 104 to pick up heat from the storage area 120 of the low temperature reservoir 104. The same channels 120 of the low temperature heat reservoir 104 are used for charging and discharging the low temperature heat reservoir 104. The generated or preheated steam is then passed through appropriate channels 124 in the high temperature heat reservoir 108 where it is superheated and the superheated steam passes from the high temperature heat reservoir 108 to the intermediate pressure turbines 112 and thereafter to the low pressure turbines 114 to produce electricity during the high peak power periods. A controller 126 operates the plant to charge or discharge the heat reservoirs at the appropriate time.

Preferably, the boiler and the high pressure turbine are operated substantially at maximum output power at all times. When the high and low temperature heat reservoirs are discharging, the power plant will produce additional power, which is required during the peak power-periods. Therefore, the power plant can be designed with a maximum power output (when the high and low temperature reservoirs are not discharging) that is less than would otherwise be required by the plant during the high peak power periods. The maximum power output is based on the amount of steam that can be produced by the boiler. During off peak power periods, excess steam is directed to the low temperature heat reservoirs from the exit of a reheat cycle located between the high pressure turbines and the intermediate pressure turbines. Significant cost savings are achieved by designing the power plant to have a lower maximum output than would otherwise be required. Significant efficiencies are achieved by operating the plant and particularly the boiler at substantially constant power. When additional power is required during peak power periods, that power is provided by additional steam obtained from an outlet of the high temperature heat reservoir.

Figure 2:
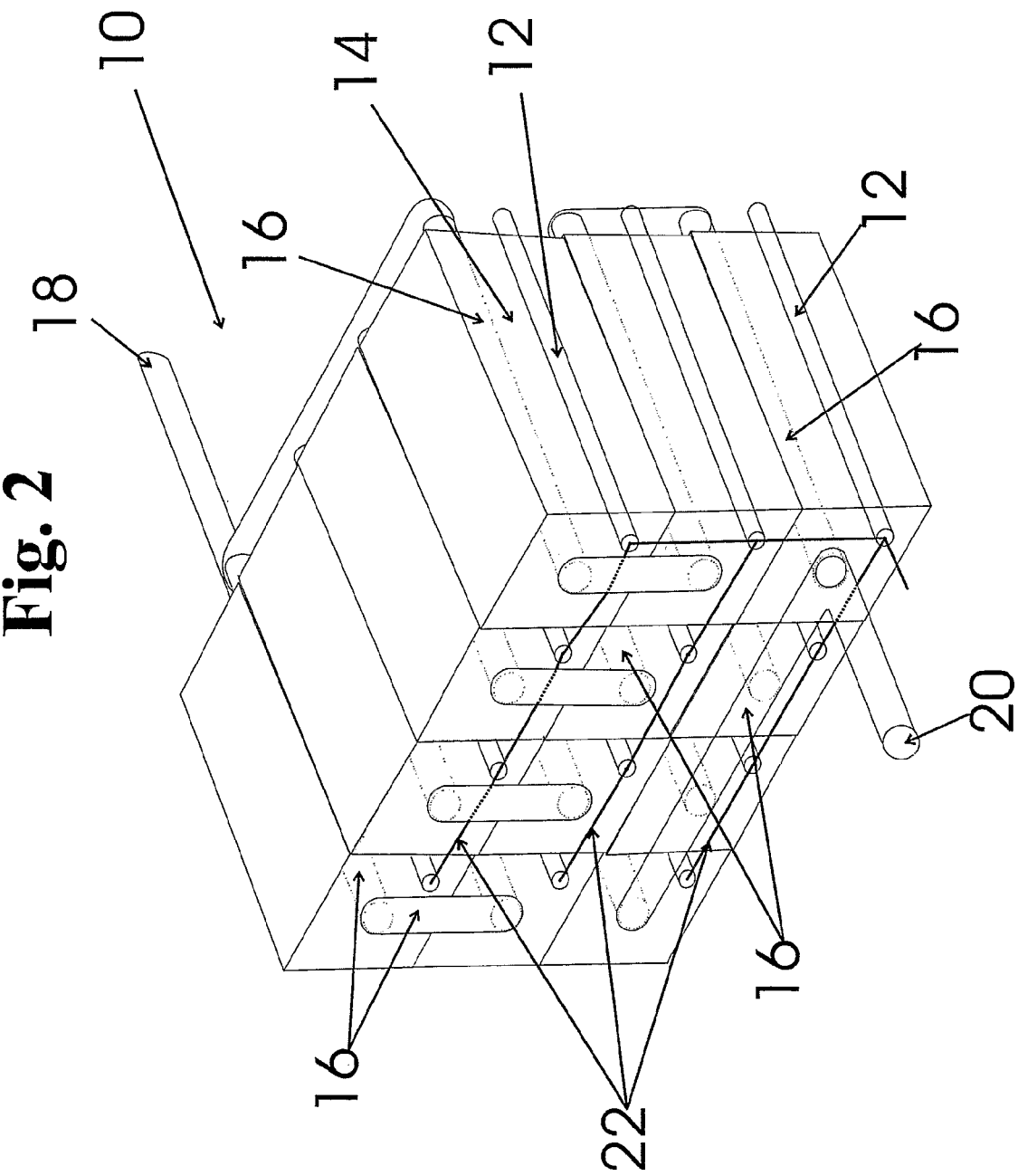
FIG. 2 is a schematic perspective view of a high temperature heat reservoir.

In FIG. 2, a high temperature heat reservoir 10 has a plurality of electric heaters 12 located therein in a storage area 14. High pressure channels 16 having a fluid inlet 18 and a fluid outlet 20 extend through the reservoir 10. The heaters are connected by electrical lines 22 to a source of electricity (not shown). The channels are high pressure channels and receive fluid that is preferably in a form of water or steam. As the fluid passes through the reservoir, it picks up heat from the heat storage area 14 and preferably exits through the outlet as superheated steam. The superheated steam is then used to power the turbines to produce electricity during peak power periods. When the high temperature heat reservoir 10 is being charged or heated, no fluid will be flowing through the channels 16.

In FIG. 3, there is shown a low temperature heat reservoir 24. The low temperature heat reservoir 24 differs from the high temperature heat reservoir 10 (of Figure) as the low temperature heat reservoir does not contain any electric heaters and has a greater number of channels 26. As the heat storage area 28 of the low temperature heat reservoir 24 is heated by steam that passes through the channels 26 and thereby heat up the heat storage area 28. The low temperature heat reservoir 24 has a fluid inlet 30 and a fluid outlet 32. The heat reservoirs 10, 24 of FIGS. 2 and 3 respectively are charged during low peak power periods and discharged during high peak power periods. During high peak power periods, the electric heaters are no longer receiving electricity and are therefore shut off. Similarly, the water or steam entering the fluid inlet 30 of the low temperature heat reservoir 24 has a lower temperature than the temperature of the heat storage area and increases in temperature between the inlet 30 and the outlet 32. The generated or preheated steam then passes into the inlet 18 of the high temperature heat reservoir 10 (see FIG. 2). When the generated or preheated steam passes through the channels 16, the steam becomes superheated.

The heat reservoirs 10, 24 are solid heat reservoirs in that they have a solid heat storage area which is formed of metal, particulates or other solid material. For example, the storage medium can be constructed of various materials including steel, iron, rocks, soapstone, lava rock, fire brick, alumina brick, magnesia brick, brick, ceramics, manufactured brick or other solid materials, including solid particulate materials. The heat storage area of the heat reservoirs and particularly of the high temperature heat reservoir is constructed of materials than can be heated and cooled repeatedly without breaking down or losing their heat storage capacity. The electric heaters used in the heat reservoir 10 are preferably electrical resistance heaters, but other types of electric heaters can be used. The high temperature heat reservoir can be heated to temperatures exceeding 100° C. and, preferably, to temperatures in the range of 200° C. to 900° C.

When the high temperature heat storage reservoir is referred to as being solid, that term is to be interpreted as meaning that the heat storage area of the low temperature heat reservoir is made from solid material and that the electric heaters are embedded in that material. The solid material can be one or more pieces of material and can be solid particulate material.

The low temperature heat storage reservoir is preferably also solid and can be made from the same or different materials as the high temperature heat storage reservoir. The low temperature heat storage reservoir does not contain electric heaters.

The power plant is operated substantially at maximum output capacity on a continuous basis during high peak power periods and off peak power periods. Part of the electricity generated by the power plant during off peak power periods is used to transfer heat to the high temperature heat reservoir. The electricity is used to power the electric heaters and the heaters add heat energy to the high temperature heat reservoir. Steam is transferred from the means to convert energy to the low temperature heat reservoir. The plant is controlled to charge the reservoirs as required and to discharge the reservoirs by transferring heat from the low temperature heat reservoir to the high temperature heat reservoir and from the high temperature heat reservoir to the means to convert energy during peak power periods, thereby increasing the output capacity of the plant.

The means to convert energy from the energy source to electricity includes a boiler. The boiler is operated at substantially maximum capacity on a continuous basis during high peak power periods and off peak power periods. Part of the electricity generated by the power plant during off peak power periods is used to transfer heat to the high temperature heat reservoir and to transfer steam from the means to convert energy to the low temperature heat reservoir. The plant is controlled to discharge the reservoirs by transferring heat from the low temperature heat reservoir to the high temperature heat reservoir and from the high temperature heat reservoir to the means to convert energy to electricity, thereby supplementing the substantially maximum output of the boiler.

Preferably, the heat reservoirs are charged during off peak power periods and discharged during peak power periods and the power plant is controlled accordingly. The temperature of the high temperature heat reservoir is preferably charged to a temperature ranging from substantially 200° C. to substantially 900° C. and the low temperature heat reservoir is charged to a temperature exceeding substantially 100° C.

We claim:

1. A power plant for generating electricity comprising an energy source, turbines to convert energy from said energy source to electricity, a high temperature heat reservoir and a low temperature heat reservoir, said high temperature heat reservoir being solid and being connected to receive at least some of said electricity generated by said power plant, said high temperature heat reservoir being heated by electricity, said low temperature heat reservoir being connected to be heated by receiving steam from said turbines, said reservoirs being connected to return heat energy to said turbines, with a controller for said power plant to operate said power plant to store energy in said reservoirs during off peak power periods and to transfer heat directly from said low temperature heat reservoir to said high temperature heat reservoir and directly from said high temperature heat reservoir to said turbines during high peak power periods, said turbines being connected to produce electricity from said heat energy.

2. A power plant as claimed in claim 1 wherein said high temperature heat reservoir contains a plurality of electric heaters, said heaters being embedded in said high temperature heat reservoir and being connected to receive said electricity from said power plant.

3. A power plant as claimed in claim 2 wherein said energy sources are at least one selected from the group of natural gas, coal, nuclear, oil, solar, wind turbines and flowing water.

4. A power plant as claimed in claim 2 wherein said low temperature reservoir is connected to preheat or generate steam for said high temperature heat reservoir and said high temperature heat reservoir is connected to provide superheated steam to said turbines.

5. A power plant as claimed in claim 4 wherein there are one or more high pressure turbines, intermediate pressure turbines, and low pressure turbines.

6. A power plant as claimed in claim 4 wherein said high temperature heat reservoir has a heat storage area and said electric heaters are embedded in said heat storage area.

7. A power plant as claimed in claim 6 wherein said heat storage area is constructed of a material selected from the group of steel, iron, rocks, soapstone, lava rock, fire brick, alumina brick, magnesia brick, ceramics and manufactured brick.

8. A power plant as claimed in claim 7 wherein said low temperature heat reservoir is constructed of materials that are capable of storing heat energy at temperatures exceeding substantially 100° C.

9. A power plant as claimed in claim 8 wherein said high temperature heat reservoir is constructed of materials that are capable of storing heat energy at temperatures ranging from substantially 200° C. to substantially 900° C.

10. A power plant as claimed in claim 9 wherein said heat storage area is constructed of materials that can be heated and cooled repeatedly without said materials breaking down or substantially losing their heat storage capacity.

11. A power plant as claimed in claim 7 wherein said heat storage area contains solid particulate material as said heat storage medium in which said electric heaters are embedded.

12. A power plant as claimed in claim 4 wherein said low temperature heat reservoir has a heat storage area having a solid heat storage medium.

* * * * *